United States Patent [19]

Rinehart

[11] 4,192,689

[45] Mar. 11, 1980

[54] ION EXCHANGE STRENGTHENING OF SODA-LIME-SILICA GLASS

[75] Inventor: Dale W. Rinehart, Natrona Heights, Pa.

[73] Assignee: PPG Industries, Inc., Pittsburgh, Pa.

[21] Appl. No.: 910,705

[22] Filed: May 30, 1978

[51] Int. Cl.$^2$ .................... C03C 3/04; C03C 21/00
[52] U.S. Cl. .................... 106/52; 65/30 E; 428/410
[58] Field of Search .......... 65/30 E; 106/52, 53

[56] References Cited

U.S. PATENT DOCUMENTS

| | | | |
|---|---|---|---|
| 2,669,808 | 2/1954 | Duncan et al. | 65/30 |
| 3,001,880 | 9/1961 | Ruskin | 106/50 |
| 3,218,220 | 11/1965 | Weber | 428/410 |
| 3,485,702 | 12/1969 | Mochel | 428/410 |
| 3,490,885 | 1/1970 | Hammer | 106/52 |
| 3,639,198 | 2/1972 | Plumat et al. | 161/43 |
| 3,728,095 | 4/1973 | Grubb et al. | 65/30 |
| 3,752,729 | 8/1973 | Mochel | 428/410 |
| 3,772,135 | 11/1973 | Hara et al. | 161/164 |
| 3,790,430 | 2/1974 | Mochel | 428/410 |
| 3,791,809 | 2/1974 | Lau | 65/30 |
| 3,801,423 | 4/1974 | Van Laethem | 428/412 |
| 3,951,671 | 4/1976 | Parry et al. | 106/52 |
| 4,012,131 | 3/1977 | Krohn et al. | 106/47 Q |
| 4,015,045 | 3/1977 | Rinehart | 106/52 |
| 4,036,623 | 7/1977 | Deeg et al. | 106/47 Q |
| 4,053,679 | 10/1977 | Rinehart | 106/52 |
| 4,055,703 | 10/1977 | Rinehart | 106/52 |
| 4,065,317 | 12/1977 | Baak et al. | 106/52 |
| 4,091,951 | 5/1978 | Zijlstra et al. | 106/52 |
| 4,119,760 | 10/1978 | Rinehart | 106/52 |

OTHER PUBLICATIONS

Tooley, F. V., Handbook of Glass Manufacture, pp. 67 and 69 (1953), pub. by Ogden Pub. Co.
Bhatye, S. V. –"Effect of Small Additions of Alumina, Boric Oxide and Titania on the Properties of a Soda–Lime–Silica Glass"–Glass & Ceramic Bull. 12(4) 1965, pp. 111–116.
Nordberg, M. E. et al. –"Strengthening by Ion Exchange" J. Am. Cer. Soc. 47(5) (1964), pp. 215–219.

Primary Examiner—Helen M. McCarthy
Attorney, Agent, or Firm—Dennis G. Millman

[57] ABSTRACT

Ion exchange strengthening of soda-lime-silica glass compositions may be carried out at higher temperatures and thus greater speeds if the glasses include about 2.5 to 4.5 percent by weight $Al_2O_3$ and/or 2 to 4.5 percent by weight $ZrO_2$.

6 Claims, No Drawings

ION EXCHANGE STRENGTHENING OF SODA-LIME-SILICA GLASS

BACKGROUND OF THE INVENTION

This invention relates to below-the-strain-point ion exchange strengthening techniques as taught by Weber in U.S. Pat. No. 3,218,220. In particular, the invention deals with strengthening soda-lime-silica glass compositions containing sodium, whereby the sodium ions in the glass are replaced by larger potassium ions from an external source to induce compression at the surface of the glass. Because of its substantial sodium oxide content conventional soda-lime-silica glass of the type found in flat glass may be used for ion exchange strengthening, but the treatment time required to attain adequate strength and compression layer depth is often longer than desired. Many attempts have been made to produce glass compositions which can be ion exchange strengthened more rapidly, chief among which are the $Al_2O_3$ and/or $ZrO_2$ containing glasses disclosed by Mochel in U.S. Pat. Nos. 3,485,702, 3,752,729, and 3,790,430. Such specially adapted glass compositions, while capable of yielding greatly enhanced ion exchange properties do not lend themselves to replacing the conventional soda-lime-silica compositions for flat glass because they usually entail sacrificing other desirable properties of the glass and often include costly batch ingredients. For example, relatively high $Al_2O_3$ content of some specialized ion exchange glass compositions increases the melting temperature of such glasses and reduces their resistance to chemical attack. Relatively high $ZrO_2$ contents of some of these modified glass compositions leads to devitrification problems when they are melted and formed into flat glass. Also, $ZrO_2$ sources can be costly. Thus, it would be desirable if soda-lime-silica glass compositions could have their ion exchange properties enhanced without significantly deviating from the physical properties of commercial flat glass.

Soda-lime-silica flat glass compositions typically fall within the following compositional range on a weight percent basis:

| | | | |
|---|---|---|---|
| $SiO_2$ | — | 69–75 | percent |
| $Na_2O$ | — | 12–16 | percent |
| $K_2O$ | — | 0–2 | percent |
| $CaO$ | — | 8–12 | percent |
| $MgO$ | — | 2–5 | percent |
| $Al_2O_3$ | — | 0–2 | percent |

Also included may be up to about 5 percent total of melting and fining aids, such as $MnO$, $TiO_2$, $ZnO$, $PbO$, $SO_3$, $Sb_2O_3$, $As_2O_3$, and colorants such as $Fe_2O_3$, $NiO$, and $CoO$.

SUMMARY OF THE INVENTION

In the present invention, soda-lime-silica glass compositions having essentially the same physical properties as conventional flat glass compositions have their ion exchange properties enhanced, and in some cases also have their melting temperatures lowered by the inclusion of relatively small amounts of $Al_2O_3$ and/or $ZrO_2$. The alumina and zirconia contents are greater than that normally found in soda-lime-silica glass compositions but less than that in glass compositions specifically formulated for ion exchange. More specifically, alumina is included in a weight percent range of about 2.5 to 4.5 percent and zirconia in a weight percent range of about 2 to 4.5 percent. It has been found that when soda-lime-silica glass compositions are thus modified by the inclusions of alumina and/or zirconia their strain point temperatures are advantageously raised, and in the most preferred embodiments their melting temperatures are reduced as well. The lowered melting temperature means that less energy is consumed in producing a given amount of glass, and the increased strain point temperature advantageously enables ion exchange strengthening treatments to be carried out at higher temperatures and thus greater speed without the danger of thermally relaxing the induced stresses.

In order to accommodate the alumina and/or zirconia additions to the soda-lime-silica glass compositions, the silica content may be reduced slightly, and it was also found to be advantageous to reduce the CaO concentration in order to avoid devitrification problems.

DETAILED DESCRIPTION

The glass compositions of the present invention consist essentially of the following constituent ranges in percent by weight on the oxide basis:

| | | | |
|---|---|---|---|
| $SiO_2$ | — | 67–74 | percent |
| $Na_2O$ | — | 12–17 | percent |
| $K_2O$ | — | 0–8 | percent |
| $(Na_2O + K_2O)$ | — | 12–17 | percent |
| $CaO$ | — | 6–9 | percent |
| $Al_2O_3$ | — | 2.5–4.5 | percent |
| | or | | |
| $ZrO_2$ | — | 2–4.5 | percent |
| | or | | |
| $(Al_2O_3 + ZrO_2)$ | — | 3–9 | percent |

Additionally, up to about 5 percent by weight total of conventional melting and fining aids and colorants may be included in the above composition. Magnesium oxide may be substituted for part of the calcium oxide, in which case the glasses of the present invention have the following composition by weight on the oxide basis:

| | | | |
|---|---|---|---|
| $SiO_2$ | — | 67–74 | percent |
| $Na_2O$ | — | 12–17 | percent |
| $K_2O$ | — | 0–8 | percent |
| $(Na_2O + K_2O)$ | — | 12–17 | percent |
| $CaO$ | — | 4–8.5 | percent |
| $MgO$ | — | 0–7 | percent |
| $(CaO + MgO)$ | — | 6–13 | percent |
| $Al_2O_3$ | — | 2.5–4.5 | percent |
| | or | | |
| $ZrO_2$ | — | 2–4.5 | percent |
| | or | | |
| $(Al_2O_3 + ZrO_2)$ | — | 3–4.5 | percent |

Likewise, up to about 5 percent of optional melting and fining aids and colorants may be included in the above composition. In the case of the MgO-containing composition set forth above, the novel compositions of the present invention may also include CaO concentrations up to 9 percent provided that the $Al_2O_3$ concentration is at least 3.5 percent or if $ZrO_2$ is present in the concentration of at least 2 percent or if the sum of $Al_2O_3$ plus $ZrO_2$ is at least 3.5 percent.

The primary object of the present invention is to raise the strain point of soda-lime-silica glasses so as to permit ion exchange strengthening at higher temperatures. However, because changes in the strain point closely correspond to changes in the annealing point, and because the techniques for measuring annealing point are more practical than those for measuring strain point, annealing points rather than strain points are reported in the examples presented herein. But it should be understood that the following data and comments regarding annealing points are actually indirect observations of effects on the strain points.

The annealing point of glass has been generally considered to be the temperature at which stresses in the glass are substantially relieved in a matter of minutes—sometimes said to correspond to a viscosity of $10^{13}$ poises—whereas the strain point has been considered the temperature at which stresses within the glass are relieved in a matter of hours—sometimes said to correspond to a viscosity of $10^{14.5}$ poises. A more precise test for annealing point and strain point is the fiber elongation method set forth in ASTM C 336-71. However, yet another technique for determining annealing points was employed here as will be set forth in greater detail hereinbelow.

Table I shows the effect of adding $ZrO_2$ to a conventional soda-lime-silica composition. Example 1 represents a sheet glass composition typical of prior art soda-lime-silica glasses. In Examples 2 and 3, substitutions of $ZrO_2$ at 2 percent and 4 percent concentrations respectively in place of $SiO_2$ exhibit corresponding increases in the annealing points.

TABLE I

|  | Example 1 | Example 2 | Example 3 |
|---|---|---|---|
|  | (sheet glass) |  |  |
| $SiO_2$ | 73.3 | 71.3 | 69.3 |
| $Na_2O$ | 13.3 | 13.3 | 13.3 |
| CaO | 8.6 | 8.6 | 8.6 |
| MgO | 3.5 | 3.5 | 3.5 |
| $Al_2O_3$ | 1.3 | 1.3 | 1.3 |
| $ZrO_2$ | — | 2.0 | 4.0 |
| Annealing point, °F. (°C.) | 1030 (554) | 1044 (562) | 1063 (573) |
| Melting temp., °F. (°C.) | 2677 (1469) | — | — |
| Forming temp., °F. (°C.) | 1909 (1043) | — | — |
| Liquidus temp., °F. (°C.) | 1815 (991) | 1860 (1016) | — |
| Working range, °F. (°C.) | 94 (52) | — | — |
| Compression layer depth, microns | 29 | — | — |

It should be noted that many of the glass compositions set forth in the examples are not within the scope of the present invention, but are included for the sake of demonstrating the effects of varying the constituents.

Table II shows another comparison between two soda-lime-silica glass compositions, one with 4 percent $ZrO_2$ and the other with no $ZrO_2$. Example 5 with 4 percent $ZrO_2$ shows a significant increase in annealing point, but very advantageously, also shows a reduced melting temperature. Strength after ion exchange as measured by modulus of rupture (M.O.R.) also shows major improvement in Example 5 in comparison with Example 4.

TABLE II

|  | Example 4 | Example 5 |
|---|---|---|
| $SiO_2$ | 73.0 | 69.0 |
| $Na_2O$ | 16.0 | 16.0 |
| $K_2O$ | 3.0 | 3.0 |
| CaO | 1.6 | 1.6 |
| MgO | 6.4 | 6.4 |
| $ZrO_2$ | — | 4.0 |
| Annealing point, °F. (°C.) | 929 (498) | 966 (519) |
| Melting temp. °F. (°C.) | 2666 (1463) | 2640 (1449) |

TABLE II-continued

|  | Example 4 | Example 5 |
|---|---|---|
| Forming temp., °F. (°C.) | 1870 (1021) | 1912 (1044) |
| M.O.R., psi (kg/cm²) | 18,700 (959) | 36,800 (2576) |

$Al_2O_3$ also serves to increase the annealing point as can be seen in Table III, wherein the $Al_2O_3$ content of Example 7 is responsible for the higher annealing point than Example 6, an elementary soda-lime-silica composition. However, the $Al_2O_3$ does not have as great an effect as a comparable $ZrO_2$ inclusion as can be seen from Example 8 where the same basic glass composition with $ZrO_2$ in place of $Al_2O_3$ has an even higher annealing point. Additionally, $ZrO_2$ is preferred over $Al_2O_3$ because $Al_2O_3$ tends to increase the melting temperature of the glass and decreases the durability of the glass. On the other hand, $Al_2O_3$ can yield a more favorable working range than $ZrO_2$. Working range is the difference between the forming temperature and the liquidus temperature, and the greater the working range the easier it is to form the glass without incurring devitrification problems.

TABLE III

|  | Example 6 | Example 7 | Example 8 |
|---|---|---|---|
| $SiO_2$ | 77.0 | 73.0 | 73.0 |
| $Na_2O$ | 16.5 | 16.5 | 16.5 |
| CaO | 6.5 | 6.5 | 6.5 |
| $Al_2O_3$ | — | 4.0 | — |
| $ZrO_2$ | — | — | 4.0 |
| Annealing point, °F. (°C.) | 963 (517) | 1001 (538) | 1022 (550) |
| Melting temp., °F. (°C.) | 2659 (1459) | 2735 (1502) | 2663 (1462) |
| Forming temp., °F. (°C.) | 1859 (1015) | 1906 (1041) | 1911 (1044) |
| Liquidus temp., °F. (°C.) | 2020 (1104) | 1574 (857) | 1716 (936) |
| Working range, °F. (°C.) | −161 (−89) | 332 (184) | 195 (108) |
| Compression layer depth, microns | — | 61 | 61 |

In Table IV, a series of examples illustrate the effect of adding $ZrO_2$ in comparison with adding both $ZrO_2$ and $Al_2O_3$. Example 9 is a simple soda-lime-silica composition and the addition of 4 percent $ZrO_2$ in Example 10 shows an increase in annealing point and a decrease in melting temperature. In Examples 11, both $Al_2O_3$ and $ZrO_2$ were added to the same basic composition with the result that annealing point was increased even further. In Example 11, however, a disadvantageous increase in melting temperature due to the presence of $Al_2O_3$ may be noted, but the increase in melting temperature is minimized by the inclusion of $ZrO_2$. Thus, by incorporating a combination of $Al_2O_3$ and $ZrO_2$ in a soda-lime-silica composition, the annealing point increase may be maximized without unduly increasing the melting temperature. The effect of a high annealing point on the ultimate strength of the glass article after ion exchange strengthening is clearly demonstrated by the M.O.R. strength values reported in Table IV. Some of the improvement in strength of the glasses of the present invention can be attributed to the presence of $Al_2O_3$ and/or $ZrO_2$ in the glass structure, which enhances the ion exchangeability per se.

TABLE IV

|  | Example 9 | Example 10 | Example 11 |
|---|---|---|---|
| $SiO_2$ | 75.5 | 71.5 | 67.5 |
| $Na_2O$ | 16.5 | 16.5 | 16.5 |
| CaO | 8.0 | 8.0 | 8.0 |
| $Al_2O_3$ | — | — | 4.0 |

TABLE IV-continued

|  | Example 9 | Example 10 | Example 11 |
|---|---|---|---|
| $ZrO_2$ | — | 4.0 | 4.0 |
| Annealing point, °F. (°C.) | 978 (526) | 1031 (555) | 1053 (567) |
| Melting temp., °F. (°C.) | 2623 (1439) | 2614 (1434) | 2660 (1460) |
| Forming temp., °F. (°C.) | 1833 (1001) | 1887 (1031) | 1919 (1048) |
| Liquidus temp., °F. (°C.) | — | 1695 (924) | 1736 (947) |
| Working range, °F. (°C.) | — | 192 (107) | 183 (102) |
| M.O.R., p.s.i. (kg/cm$^2$) | 22,400 (1568) | 38,700 (2709) | 49,800 (3486) |
| Compression layer depth, microns | — | 53 | 53 |

In Table V, an increase in annealing point is again shown as a result of an insertion of $ZrO_2$ into a simple soda-lime-silica composition. But, in this case, a relatively high CaO concentration is apparently responsible for a disadvantageous increase in the liquidus temperature and thus a decrease in the working range in Example 13. The same effect with high concentrations of CaO is shown in Table VI in connection with adding $Al_2O_3$. There, in Example 15, the annealing point was increased but the working range was drastically reduced to an unacceptable negative value. Accordingly, the glass compositions of the present invention are limited to CaO concentrations no greater than 9 percent by weight, preferably no greater than 8.5 percent by weight. Minimizing CaO is also preferred in order to maximize compression layer depth.

TABLE V

|  | Example 12 | Example 13 |
|---|---|---|
| $SiO_2$ | 73.0 | 69.0 |
| $Na_2O$ | 16.0 | 16.0 |
| CaO | 11.0 | 11.0 |
| $ZrO_2$ | — | 4.0 |
| Annealing point, °F. (°C.) | 1021 (549) | 1054 (568) |
| Liquidus temp., °F. (°C.) | 1788 (976) | 1836 (1002) |

TABLE VI

|  | Example 14 | Example 15 |
|---|---|---|
| $SiO_2$ | 73.7 | 69.7 |
| $Na_2O$ | 15.2 | 15.2 |
| CaO | 10.1 | 10.1 |
| $Al_2O_3$ | 1.0 | 5.0 |
| Annealing point, °F. (°C.) | 1027 (553) | 1050 (566) |
| Melting temp., °F., (°C.) | 2610 (1432) | 2674 (1468) |
| Forming temp., °F. (°C.) | 1857 (1014) | 1889 (1037) |
| Liquidus temp., °F. (°C.) | 1775 (968) | 1912 (1044) |
| Working range, °F. (°C.) | 82 (46) | −23 (−13) |

Low CaO levels, on the other hand, can also be disadvantageous for the purposes of the present invention. As shown in the examples in Table VII, decreasing the amount of CaO leads to a lowering of the annealing point. Therefore, it is preferred that the CaO level be maintained no lower than 6 percent by weight. MgO may be substituted in part for CaO in the glasses of the invention, in which case, the sum of the CaO and MgO components should be no lower than 6 percent by weight.

TABLE VII

|  | Example 16 | Example 17 | Example 18 |
|---|---|---|---|
| $SiO_2$ | 74.0 | 75.0 | 75.0 |
| $Na_2O$ | 16.5 | 16.5 | 17.5 |
| CaO | 5.5 | 4.5 | 3.5 |
| $ZrO_2$ | 4.0 | 4.0 | 4.0 |
| Annealing point, °F. (°C.) | 1006 (541) | 1002 (539) | 961 (516) |
| Melting temp., °F. (°C.) | 2692 (1478) | 2727 (1497) | 2716 (1491) |
| Forming temp., °F. (°C.) | 1921 (1049) | 1932 (1056) | 1928 (1053) |
| Liquidus temp., °F. (°C.) | 1781 (972) | 1866 (1019) | 1813 (989) |
| Working range, °F. (°C.) | 140 (78) | 66 (37) | 115 (64) |
| Compression layer depth, microns | 70 | 74 | — |

The largest single component of these glasses is $SiO_2$, the primary glass former, and its presence is required to provide a strong, durable glass. Minimizing the $SiO_2$ content, however, is desirable so as to lower the melting temperature. $Na_2O$ is present as a fluxing agent and at least the minimum amount prescribed should be present in the glass to maintain the melting temperature at a practical level. However, an excess of $Na_2O$ can reduce the resistance of the glass to chemical attack. $K_2O$ is also a fluxing agent and may be substituted for some of the $Na_2O$. A small amount of $K_2O$ has been found to enhance ion exchange properties of some glasses, but when, as in the present case, the exchanging ion is potassium, an excess of $K_2O$ can reduce the ion exchange propensity of the glass.

The glasses of the present invention may also include minor amounts of conventional melting and fining aids found in commercial flat glass compositions, such as $SO_3$, $Sb_2O_3$, $As_2O_3$, MnO, $TiO_2$, PbO, ZnO, and colorants such as $Fe_2O_3$, CoO, and NiO. These additional ingredients should constitute no more than about 5 percent by weight in total of the glass composition. The glasses of the present invention should be essentially free from $Li_2O$ (no more than about 0.1 percent by weight) because of its "poisoning" effect on a potassium ion exchange bath.

The majority of the examples which have been set forth heretofore do not fall within the scope of the present invention, but have been set forth merely to demonstrate the effects of certain compositional variations. Examples 10 and 11, however, are specific embodiments of the present invention and Example 2 may also be considered to be a marginal example of the present invention. In Table VIII, Examples 19 and 20 represent two more specific, preferred embodiments of the present invention. Which of these specific examples would be considered the most preferred embodiment will depend upon the particular requirements of the user. For example, the high strain point of Example 11 may make it attractive, but in other cases the low melting temperature of Example 10 may make it preferable. In yet other cases, a compromise between high strain point and low melting temperature may favor compositions similar to Example 19 or Example 20.

TABLE VIII

|  | Example 19 | Example 20 |
|---|---|---|
| $SiO_2$ | 72.3 | 71.0 |
| $Na_2O$ | 13.3 | 16.0 |
| CaO | 4.6 | 8.0 |
| MgO | 5.5 | — |
| $Al_2O_3$ | 1.3 | — |
| $ZrO_2$ | 3.0 | 4.0 |
| Annealing point, °F. (°C.) | 1046 (563) | 1039 (559) |
| Melting temp., °F. (°C.) | — | 2626 (1441) |
| Forming temp., °F. (°C.) | — | 1898 (1037) |
| Liquidus temp., °F. (°C.) | — | 1711 (933) |
| Working range, °F. (°C.) | — | 187 (104) |

TABLE VIII-continued

|  | Example 19 | Example 20 |
|---|---|---|
| Compression layer depth, microns | — | 55 |

In order to further define the bounds of the present invention, there is set forth in Table IX a number of examples which, for various reasons, failed to meet the objects of the present invention. Examples 21, 22, 24, and 25 failed to have their annealing points raised, probably due to low CaO contents. On the other hand, it is apparent that Example 22 and possibly Example 23 would represent good embodiments of the present invention if about 3 percent by weight $Al_2O_3$ were substituted for $SiO_2$.

TABLE IX

|  | Examples | | | | |
|---|---|---|---|---|---|
|  | 21 | 22 | 23 | 24 | 25 |
| $SiO_2$ | 70.5 | 70.2 | 70.2 | 70.2 | 69.2 |
| $Na_2O$ | 14.5 | 10.0 | 10.0 | 10.0 | 10.0 |
| $K_2O$ | 3.0 | 7.8 | 7.8 | 7.8 | 7.8 |
| CaO | 1.6 | 1.6 | 8.0 | 4.0 | 4.0 |
| MgO | 6.4 | 6.4 | — | — | 5.0 |
| $Al_2O_3$ | — | — | — | — | — |
| $ZrO_2$ | 4.0 | 4.0 | 4.0 | 4.0 | 4.0 |
| ZnO | — | — | — | 4.0 | — |
| Annealing point, °F. (°C.) | 993 (534) | 1023 (551) | 1029 (554) | 987 (531) | 1019 (548) |
| Melting temp., °F. (°C.) | 2718 (1492) | 2793 (1534) | 2690 (1477) | 2754 (1512) | 2731 (1499) |
| Forming temp., °F. (°C.) | 1968 (1076) | 2043 (1117) | 1935 (1057) | 1972 (1078) | 1989 (1087) |
| Liquidus temp., °F. (°C.) | — | <1530 (832) | — — | — — | — |
| Working range, °F. (°C.) | — | >500 (278) | — — | — | — |
| M.O.R., p.s.i. (kg/cm$^2$) | 44,600 (3122) | 49,900 (3493) | 41,100 (2877) | 36,400 (2548) | — |
| Compression layer depth, microns | 70.8 | 99 | 77 | 99 | — |

The glasses of the examples were melted in an electric furnace at about 1500° C. in 4 inch (10 centimeters) diameter platinum crucibles from batch materials calculated to yield about 750 grams of the oxide composition. Batch constituents included "Supersil" sand ($SiO_2$), reagent grade $Na_2CO_3$, $Al(OH)_3$, $K_2CO_3$, $CaCO_3$, $MgCO_3$, ZnO, and zircon sand ($ZrSiO_4$). The batch ingredients were added incrementally over a period of about three hours while being stirred. Each melt was stirred for an additional period of about sixteen hours. Thereafter, each melt was held in the furnace without stirring for one more hour to refine the glass, after which a number of rods were drawn from each melt and the remainder of each melt was cast onto an iron plate and rolled to about 3/16 inch thickness. The rods and cast plates were then annealed.

"Melting temperature" for the purposes of this application is taken as the temperature at which glass has a viscosity of 100 poises. It is usually considered desirable for a flat glass composition to exhibit a viscosity of 100 poises at a temperature below about 2,850° F. (1566° C.). "Forming temperature" is defined as the temperature at which the glass exhibits a viscosity of 10,000 poises. Both melting temperature and forming temperature in the examples were determined by a standard rotating spindle viscometer technique.

Liquidus temperatures were determined by placing pieces of the glass sample into an enlongated refractory boat which was then placed into a gradient furnace. There, the glass was melted and held for a period of time at the graduated temperatures after which the glass was examined for the presence of crystal growth along the length of the melted sample.

Annealing points were determined from differential thermal analysis traces of the glasses calibrated against similar traces of standard glasses with known annealing points.

Compression layer depths after ion exchange were measured for the examples by sawing and grinding a cross-sectional slice from a piece of an ion exchanged sample and the slice was then observed under a microscope with cross-polaroids. Compression layer depth is an important factor in determining the effective strength of a treated glass article in actual use. An ion exchanged glass article having a very high initial strength will not retain its strength when subjected to abrasion, scratching, and other wear in use if its generated compressive stress is concentrated in a very thin surface layer of the glass. Thus, the compression layer should extend deep enough into the surface of the glass to withstand the normal physical abuses to which it may be subjected. The minimum compression layer depth required will depend upon the particular end use of the glass but theoretically the compression layer need extend only beyond the deepest penetration of typical surface defects in order to retain at least some of its enhanced strength. This has been estimated to be about five microns in the case of a glass plate subjected to reasonably careful handling. The ion exchange treatment to which the examples were subjected was a sixteen hour immersion in molten potassium nitrate at 900° F. (482° C.).

The strength of some of the examples after ion exchange strengthening is reported in terms of modulus of rupture (M.O.R.) measured by the abraded rod technique. Rods of the glass samples nominally three millimeters in diameter and 2.5 inches (6.5 centimeters) in length were ion exchanged in a molten bath of potassium nitrate for sixteen hours at 900° F. (482° C.). After ion exchange treatment, the rods were subjected to tumble abrasion in a sixteen ounce jar containing 200 cubic centimeters of 240 grit silicon carbide. The jar was rotated horizontally about its main axis at a speed of about 167 revolutions per minute for thirty minutes. Each abraded rod was then placed singly on a 1.5 inch (3.8 centimeters) support span and stressed to fracture with a ¾ inch (1.9 centimeters) wide load member. The load at fracture was recorded and M.O.R. calculated by the following formula: $M.O.R. = 8WL/\pi ab^2$, where W is the load at fracture, L is the difference between the load and support spans, a is the larger diameter of the rod, and b is the smaller diameter of the rod (assuming that the rod is not perfectly circular in cross-section). Each reported M.O.R. value represents the average of at least 10 rods.

The ion exchange strengthening treatment for which the glasses of the present invention are intended is well known in the art and need not be elaborated upon in great length here. The usual method of treating the glass articles is to immerse the glass into a bath of molten inorganic salt containing an alkali metal ion larger than sodium at a temperature between the melting point of the salt and the strain point of the glass. The larger alkali metal ion is preferably potassium, but theoretically rubidium or cesium could also be used. Alkali metal nitrates are the most commonly employed salts, although other salts such as chlorides, fluorides, phosphates, or mixtures thereof may be employed. Usually the glass articles are preheated prior to the immersion in the molten salt bath in order to avoid thermal shock. It is usually preferred that the highest salt bath temperature possible be used in order to shorten treatment time, but in other cases it may be desirable to ion exchange more slowly to obtain greater strength. Although it is said in general that the temperature should be maintained below the strain point of the glass, it should be understood that brief deviations above the strain point can be tolerated so long as the glass does not remain above the strain point for a sufficient time to cause appreciable thermal relaxation of the induced compression at the surface of the glass. With the raised strain points obtained as a result of the present invention such deviations above the strain point are less likely to be needed. Other methods of contacting the glass with the ion exchange medium include spraying the glass with a source of alkali metal ions or coating the glass with a thickened carrier mixed with the alkali metal ions.

Other modifications and variations as are known in the art may be resorted to without departing from the spirit and scope of the invention as defined by the appended claims.

I claim:

1. In a glass composition of the conventional soda-lime-silica flat glass type which consists of $SiO_2$ as the major constituent, 12 to 16 percent by weight $Na_2O$, 0 to 2 percent by weight $K_2O$, but no more than 17 percent by weight total of $Na_2O$ and $K_2O$, a substantial inclusion of CaO, optionally a relatively small amount of $Al_2O_3$, and 0 to 2 percent by weight total of $SO_3$ and colorants, essentially free of $Li_2O$, and exhibiting a melting temperature less than about 2850° F. and a working range greater than about 90° F., the improvement comprising:
 enhanced ion exchange strengthening below the strain point by virtue of an elevated annealing point above 1030° F. by the inclusion of 2 to 4.5 percent by weight $ZrO_2$ and 0 to 4.5 percent by weight $Al_2O_3$; the CaO content being restricted to 6 to 8.5 percent by weight to avoid reducing the working range; whereby the $SiO_2$ remainder is 67 to 74 percent by weight.

2. The glass of claim 1 wherein the $Al_2O_3$ concentration is zero.

3. In a glass composition of the conventional soda-lime-silica flat glass type which consists of $SiO_2$ as the major constituent, 12 to 16 percent by weight $Na_2O$, 0 to 2 percent by weight $K_2O$, but no more than 17 percent by weight total of $Na_2O$ and $K_2O$, a substantial inclusion of CaO, optionally a relatively small amount of $Al_2O_3$, and 0 to 2 percent by weight total of $SO_3$ and colorants, essentially free of $Li_2O$, and exhibiting a melting temperature less than about 2850° F. and a working range greater than about 90° F., the improvement comprising:
 enhanced ion exchange strengthening below the strain point by virtue of an elevated annealing point above 1030° F. by the inclusion of 0 to 4.5 percent by weight $ZrO_2$ and 2.5 to 4.5 percent by weight $Al_2O_3$; the CaO content being restricted to 6 to 8.5 percent by weight to avoid reducing the working range; whereby the $SiO_2$ remainder is 67 to 74 percent by weight.

4. In a glass composition of the conventional soda-lime-silica flat glass type which consists of $SiO_2$ as the major constituent, 12 to 16 percent by weight $Na_2O$, 0 to 2 percent by weight $K_2O$, but no more than 17 percent by weight total of $Na_2O$ and $K_2O$, a substantial inclusion of CaO, 0 to 5 percent by weight MgO, optionally a relatively small amount of $Al_2O_3$, and 0 to 2 percent by weight total of $SO_3$ and colorants, essentially free of $Li_2O$, and exhibiting a melting temperature less than about 2850° F. and a working range greater than about 90° F., the improvement comprising:
 enhanced ion exchange strengthening below the strain point by virtue of an elevated annealing point above 1030° F. by the inclusion of 2 to 4.5 percent by weight $ZrO_2$ and 0 to 4.5 percent by weight $Al_2O_3$ up to a total of 4.5 weight percent $Al_2O_3$ and $ZrO_2$; the CaO content being restricted to 4 to 8.5 weight percent and the total CaO and MgO content being restricted to 6 to 13 percent by weight to avoid reducing the working range; whereby the $SiO_2$ remainder is 67 to 74 percent by weight.

5. In a glass composition of the conventional soda-lime-silica flat glass type which consists of $SiO_2$ as the major constituent, 12 to 16 percent by weight $Na_2O$, 0 to 2 percent by weight $K_2O$, but no more than 17 percent by weight total of $Na_2O$ and $K_2O$, a substantial inclusion of CaO, 0 to 5 percent by weight MgO, optionally a relatively small amount of $Al_2O_3$, and 0 to 2 percent by weight total of $SO_3$ and colorants, essentially free of $Li_2O$, and exhibiting a melting temperature less than about 2850° F. and a working range greater than about 90° F., the improvement comprising:
 enhanced ion exchange strengthening below the strain point by virtue of an elevated annealing point above 1030° F. by the inclusion of 0 to 4.5 percent by weight $ZrO_2$ and 2.5 to 4.5 percent by weight $Al_2O_3$ up to a total of 4.5 weight percent $Al_2O_3$ and $ZrO_2$; the CaO content being restricted to 4 to 8.5 weight percent and the total CaO and MgO content being restricted to 6 to 13 percent by weight to avoid reducing the working range; whereby the $SiO_2$ remainder is 67 to 74 percent by weight.

6. In a glass composition of the conventional soda-lime-silica flat glass type which consists of $SiO_2$ as the major constituent, 12 to 16 percent by weight $Na_2O$, 0 to 2 percent by weight $K_2O$, but no more than 17 percent by weight total of $Na_2O$ and $K_2O$, a substantial inclusion of CaO, 0 to 5 percent by weight MgO, optionally a relatively small amount of $Al_2O_3$, and 0 to 2 percent by weight total of $SO_3$ and colorants, essentially free of $Li_2O$, and exhibiting a melting temperature less than about 2850° F. and a working range greater than about 90° F., the improvement comprising:
 enhanced ion exchange strengthening below the strain point by virtue of an elevated annealing point above 1030° F. by the inclusion of 3 to 4.5 percent by weight $ZrO_2$ and/or $Al_2O_3$; the CaO content being restricted to 4 to 8.5 weight percent and the total CaO and MgO content being restricted to 6 to 13 percent by weight to avoid reducing the working range; whereby the $SiO_2$ remainder is 67 to 74 percent by weight.

* * * * *